United States Patent
Hansl et al.

(10) Patent No.: US 9,499,349 B2
(45) Date of Patent: Nov. 22, 2016

(54) PICKING STATION AND METHOD FOR PICKING ARTICLES

(71) Applicant: TGW Logistics Group GmbH, Wels (AT)

(72) Inventors: Rudolf Hansl, Linz (AT); Reinhold Lackner, Laakirchen (AT)

(73) Assignee: TGW Logistics Group GmbH, Wels (AT)

( * ) Notice: Subject to any disclaimer, the term of this patent is extended or adjusted under 35 U.S.C. 154(b) by 4 days.

(21) Appl. No.: 14/367,356

(22) PCT Filed: Dec. 14, 2012

(86) PCT No.: PCT/AT2012/050196
§ 371 (c)(1),
(2) Date: Dec. 22, 2014

(87) PCT Pub. No.: WO2013/090962
PCT Pub. Date: Jun. 27, 2013

(65) Prior Publication Data
US 2015/0104286 A1    Apr. 16, 2015

(30) Foreign Application Priority Data
Dec. 23, 2011 (AT) .................................... 1883/2011

(51) Int. Cl.
*G06F 7/00* (2006.01)
*B65G 37/00* (2006.01)
(Continued)

(52) U.S. Cl.
CPC ............. *B65G 37/00* (2013.01); *B65G 1/1378* (2013.01); *B65G 43/10* (2013.01)

(58) Field of Classification Search
USPC ........................................................ 700/230
See application file for complete search history.

(56) References Cited

U.S. PATENT DOCUMENTS 3,670,867 A * 6/1972 Traube ................. B65G 1/1378
                                                         186/57
7,261,509 B2 * 8/2007 Freudelsperger .... B65G 1/1378
                                                         414/269
(Continued)

FOREIGN PATENT DOCUMENTS

CN         1139410 A        1/1997
DE      101 36 354 A1       2/2003
(Continued)

OTHER PUBLICATIONS

International Search Report of PCT/AT2012/050196, mailed Apr. 2, 2013.

*Primary Examiner* — Kyle Logan
(74) *Attorney, Agent, or Firm* — Collard & Roe, P.C.

(57) ABSTRACT

The invention relates to a method and to a picking station (5) for picking of articles from source loading aids (2) by an order picker into destination loading aids (6), wherein the loading aids (2, 6) are conveyed via a first conveyor system (18) to the picking station (5) and at the picking station (5) are provided for picking the articles and after a picking operation are discharged from the picking station (5) again via a second conveyor system. A control device can coordinate the conveying movements of the source loading aids (2) and destination loading aids (6) in such a manner that the source loading aids (2) and destination loading aids (6) required for processing a picking order are brought together before the picking operation in the picking station (5) onto a common picking conveyor (25) of the first conveyor system (18) passing through a working area (30) for the order picker, and are presented to the order picker arranged next to one another as a picking group on the picking conveyor (25).

15 Claims, 13 Drawing Sheets

(51) Int. Cl.
  *B65G 1/137* (2006.01)
  *B65G 43/10* (2006.01)

(56) References Cited

U.S. PATENT DOCUMENTS

| | | | |
|---|---|---|---|
| 7,766,151 B2 | 8/2010 | Schaefer | |
| 7,809,467 B2* | 10/2010 | Schaefer | B65G 1/1378 700/216 |
| 8,335,585 B2* | 12/2012 | Hansl | B65G 1/1373 414/267 |
| 8,965,560 B2* | 2/2015 | Mathi | B65G 1/1378 700/213 |
| 2009/0288996 A1* | 11/2009 | Shafer | B65G 1/1378 209/546 |
| 2009/0299521 A1* | 12/2009 | Hansl | B65G 1/1378 700/215 |
| 2011/0017575 A1 | 1/2011 | Wargo et al. | |
| 2013/0306434 A1 | 11/2013 | Issing | |

FOREIGN PATENT DOCUMENTS

| | | |
|---|---|---|
| DE | 202 11 321 U1 | 2/2003 |
| DE | 103 07 949 A1 | 9/2004 |
| DE | 10 2005 045 971 A1 | 4/2007 |
| DE | 20 2004 021 435 U1 | 4/2008 |
| DE | 10 2006 057 266 A1 | 5/2008 |
| EP | 1 452 462 A2 | 9/2004 |
| EP | 1 767 472 A1 | 3/2007 |
| EP | 1 790 591 A1 | 5/2007 |
| EP | 1 572 558 B2 | 3/2010 |
| WO | 20121085271 A1 | 6/2012 |

* cited by examiner

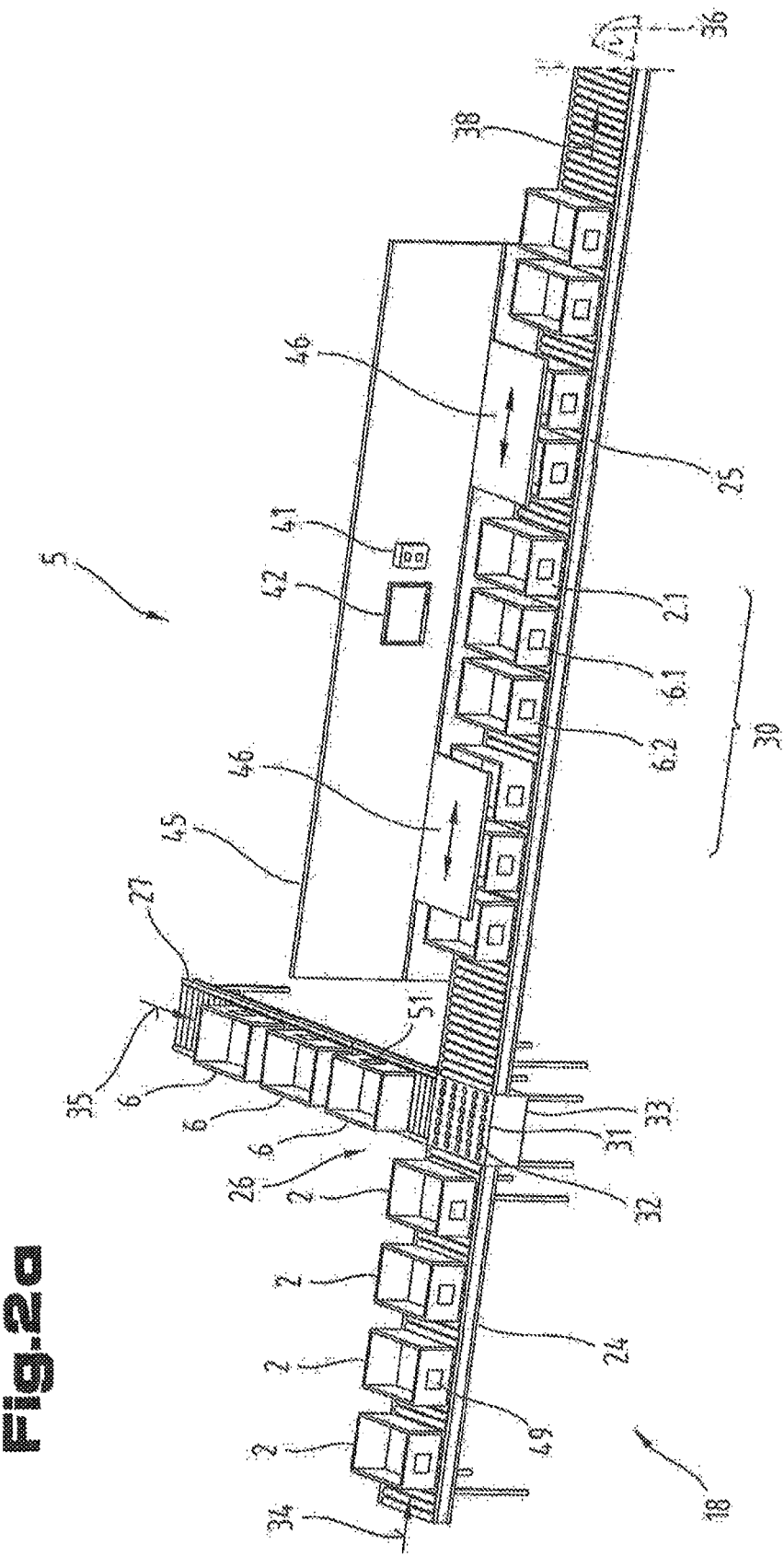

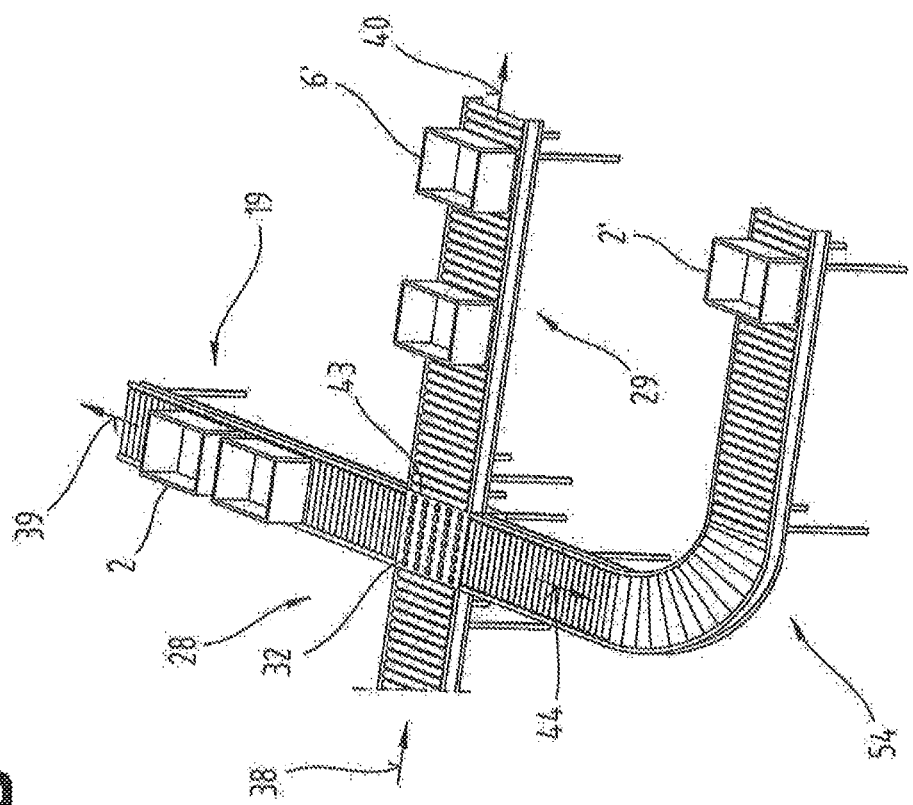

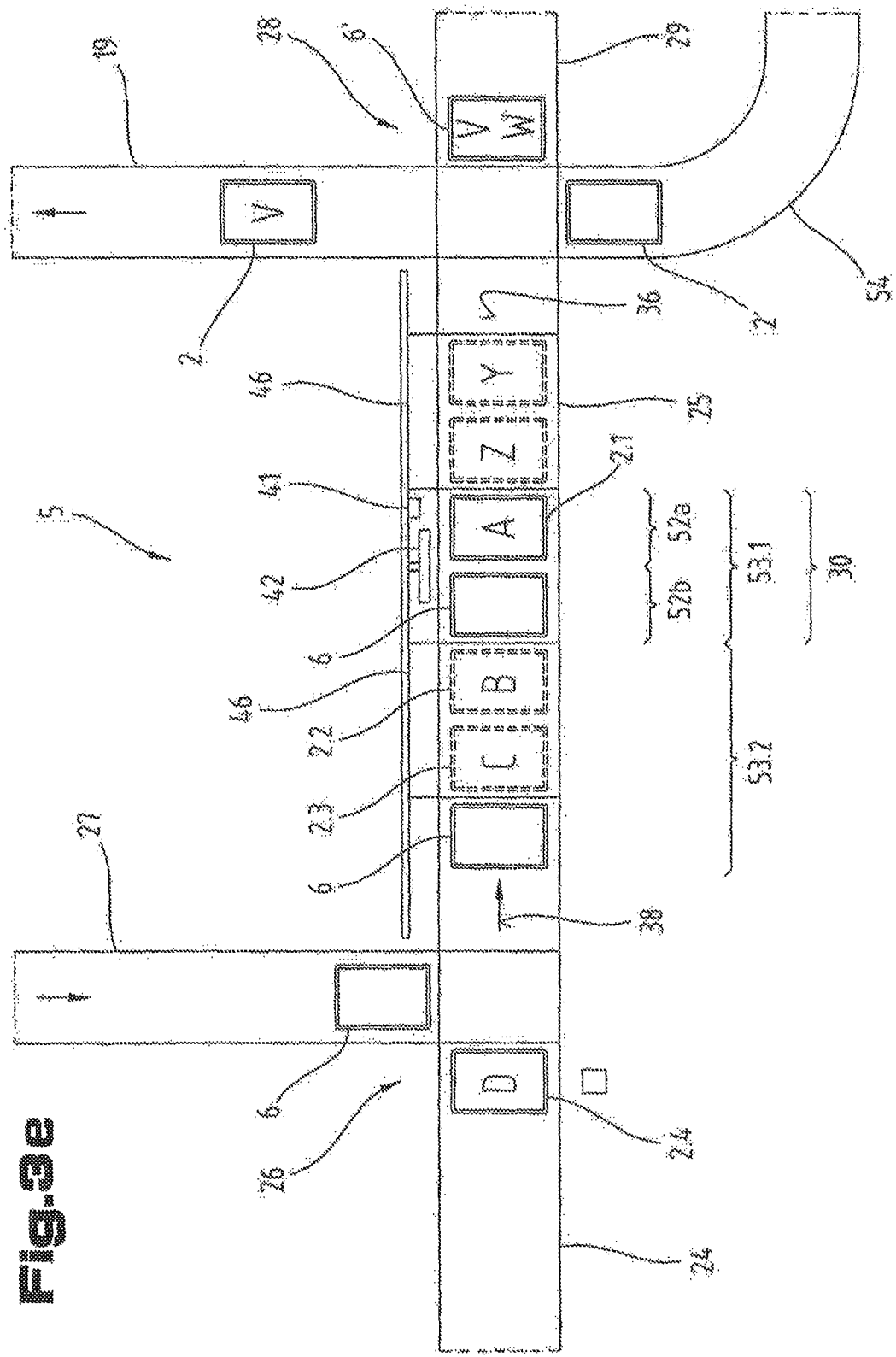

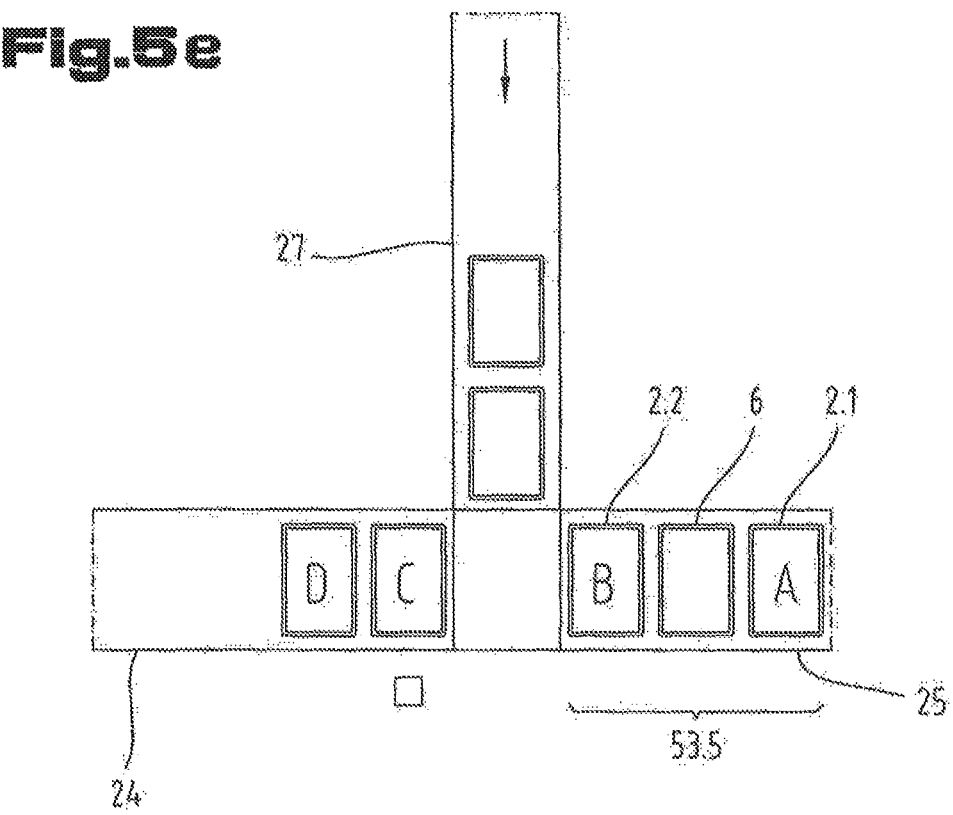

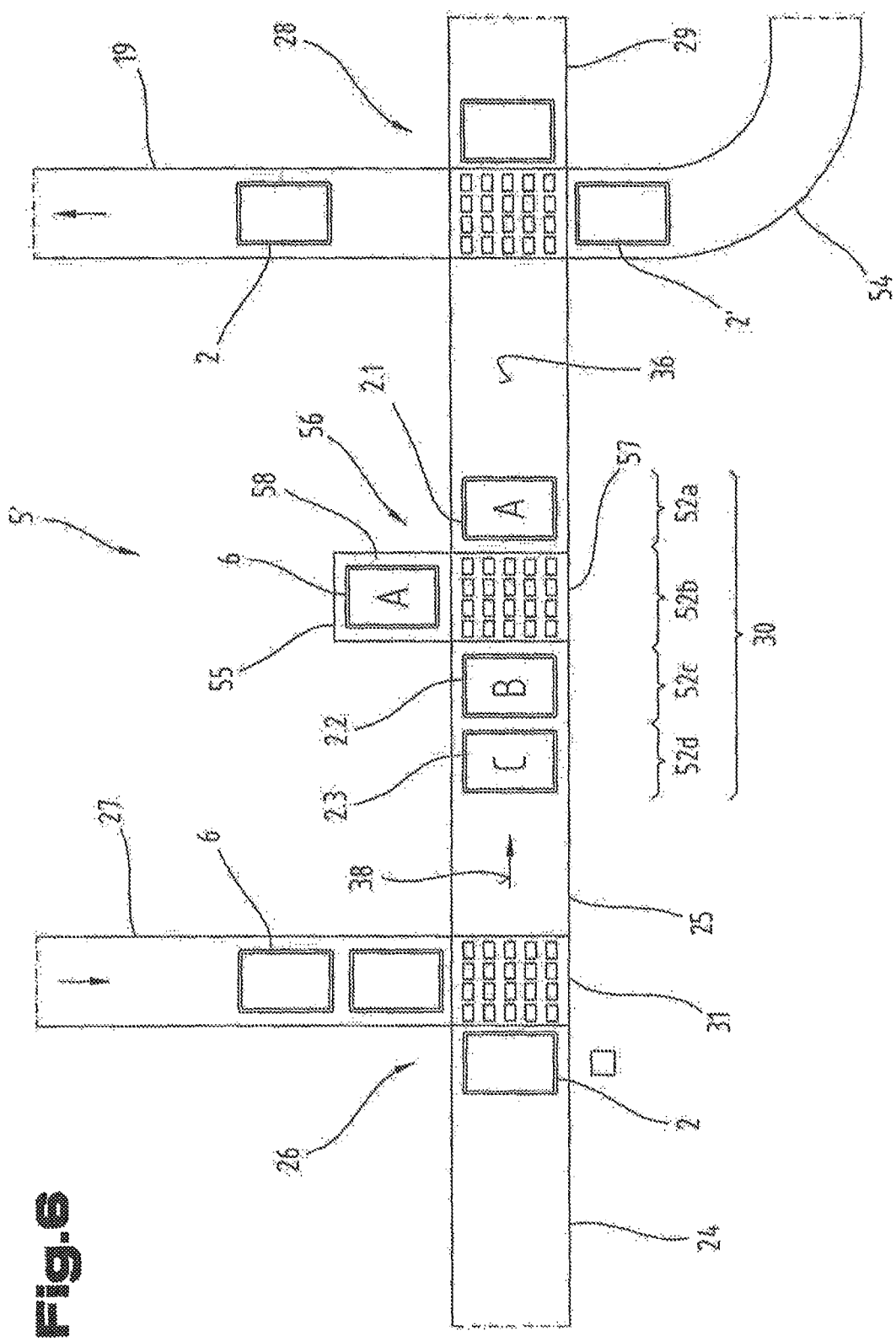

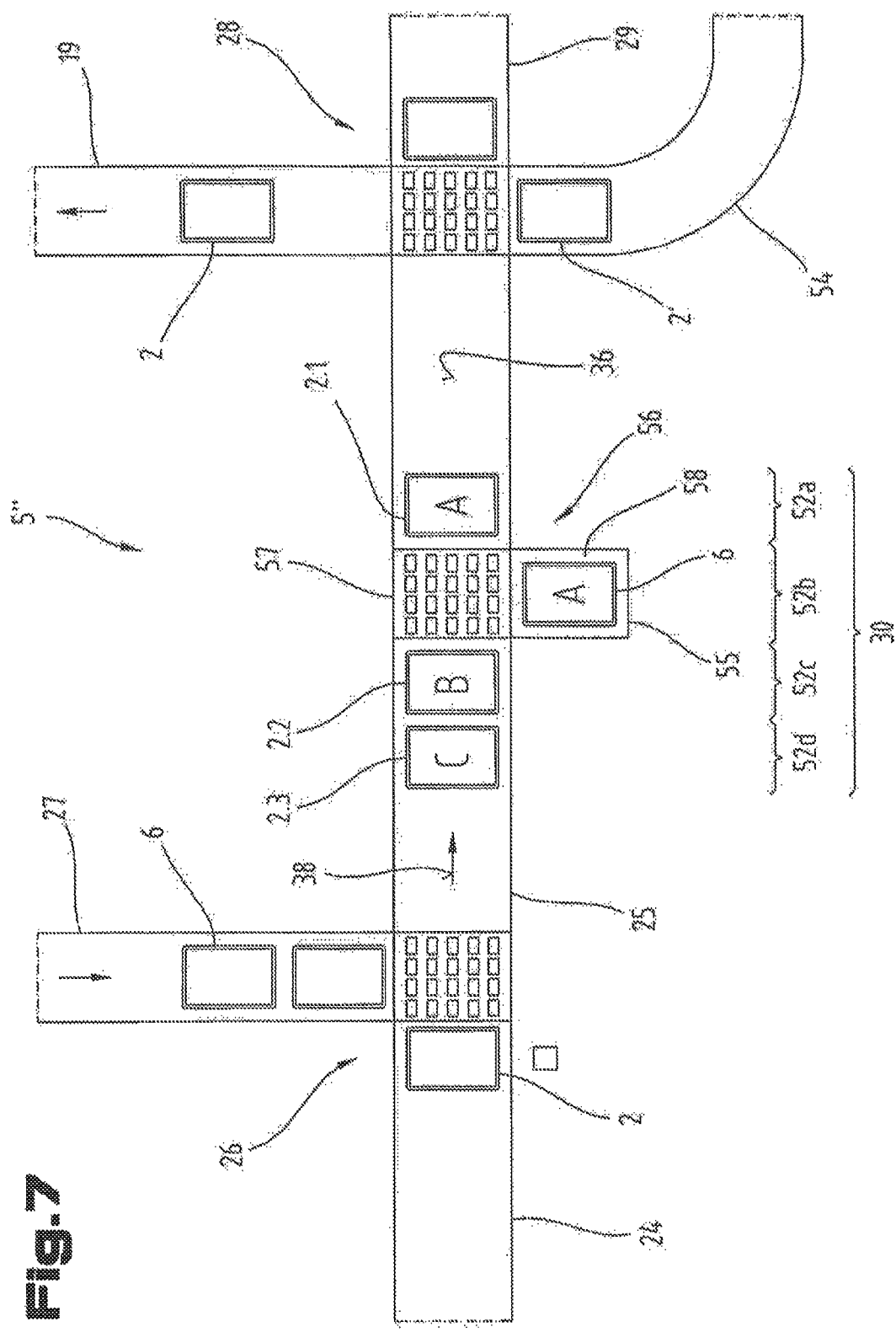

PICKING STATION AND METHOD FOR PICKING ARTICLES

CROSS REFERENCE TO RELATED APPLICATIONS

This application is the National Stage of PCT/AT2012/050196 filed on Dec. 14, 2012, which claims priority under 35 U.S.C. §119 of Austrian Application No. A 1883/2011 filed on Dec. 23, 2011, the disclosure of which is incorporated by reference. The international application under PCT article 21(2) was not published in English.

BACKGROUND OF THE INVENTION

1. Field of the Invention

The invention relates to a method for picking articles from source loading aids into destination loading aids by an order picker at an order-picking station, wherein the loading aids are conveyed via a conveyor system to an order-picking station and at the order-picking station are made available for picking the articles and after a picking operation are discharged from the order-picking station again via the conveyor system, and a control device, in particular a material flow computer, coordinates the conveying movements of the loading aids. The invention furthermore relates to an order-picking station for picking articles from source loading aids into destination loading aids by an order picker, which order-picking station comprises a first conveyor system comprising a transport conveying device for transporting source loading means to the order-picking station and a second transport conveying device for transporting destination loading aids to the order-picking station and a second conveyor system for transporting source loading aids away from the order-picking station as well as a control device, in particular a material flow computer, for coordinating the conveying movements of the loading aids.

2. Description of the Related Art

In the recent times, there has been a move towards picking based on the "goods to man" principle. Based on the goods to man principle, the order picker is assigned a fixed work station and moves away from it as little and as seldom as possible. The articles to be picked are transported to the order picker. This increases the efficiency of an order picking system and satisfies the high ergonomic demands which are becoming an increasing focus of attention.

The term "articles" should be understood as meaning articles which can be stored in an article warehouse. Such articles might be medicaments, tool parts or similar, for example, which can be ordered by customers in any number and any mix. These ordered articles are then assembled to make up a single order, and the articles are then picked and placed in a destination loading aid and the picked articles are delivered to the customer.

By destination loading aid is meant a container in which the articles to be picked are placed. A destination loading aid may hold a plurality of different articles up until the picking order assigned to it is complete, i.e. until all the articles belonging to the picking order have been transported from the article warehouse to the work station, where they are placed in the corresponding destination loading aid by the order picker.

Documents DE 10 2005 045 971 A1 and DE 101 36 354 A1 disclose an order-picking station whereby articles are picked from source loading aids and placed in destination loading aids by an order picker, which order-picking station comprises first buffer places (unloading positions) for provisioning source loading aids, second buffer places (loading positions) for provisioning destination loading aids, a first conveyor system for transporting source loading aids to the unloading positions and for transporting source loading aids from the unloading positions, as well as a second conveyor system for transporting destination loading aids to the loading positions and for transporting destination loading aids away from the loading positions. The loading positions and the unloading positions are arranged one above the other on different levels.

EP 1 572 558 A1 discloses an order-picking station and a method for picking articles from source loading aids and placing them in destination loading aids by an order picker, whereby the source loading aids are conveyed into a picking position on a conveying track of a first conveying system which track is tilted about its longitudinal axis at least in the working area of the order picker. The destination loading aids are conveyed on a second conveyor system to a buffer arranged underneath the conveying track and provided on accumulation positions in the buffer. The conveying track comprises a tilting device which tilts the source loading aids to be transported into the working area into a tilt position, and a tilt-back device which tilts the source loading aids back from their tilt position. The source loading aid is transported from the article warehouse to the order-picking station into the working area in such a way, that the source loading aid and the destination loading aid reach the working area more or less at the same time.

These known order-picking stations having conveyor systems for source loading aids and destination loading aids running in different conveying system planes are of a great size and accordingly, the transport paths for the source loading aids and the destination loading aids are long. The different height levels of the conveying system planes and the thereto related supply of source loading aids and destination loading aids on different levels cause that the requirement in terms of ergonomic design can only be met to a limited extent. The order picker must also perform longer picking movements in order to remove an article from the source loading aid and place it in a destination loading aid.

Document DE 103 07 949 A1, however, proposes the conveyor systems for source loading aids and destination loading aids be positioned within one single conveying system plane, but also this known embodiment has an increased need for space. Furthermore, the source loading aids are conveyed to a picking position via an infeed diverter device of the first conveyor system, whereupon they are conveyed away from the picking position via an outfeed diverter device of the first conveyor system. Likewise, the destination loading aids are conveyed to a picking position via an infeed diverter device of the second conveyor system, whereupon they are conveyed away from the picking position via an outfeed diverter device of the second conveyor system. The source loading aids and the destination loading aids are positioned in the working area of the order picker so that they are oriented at right angles to each other. This causes that the switching processes for source loading aids and destination loading aids are time-consuming. This has an adverse effect on the picking efficiency and/or the throughput rate.

Document WO 2012/085271 A1 describes a tray handling station for manually loading piece goods onto or unloading piece goods from a tray, wherein the tray handling station comprises a tray conveying system and a packing station, and a tray is conveyed by the tray conveying system from a storage system into a handling position in the working area of an order picker, and is fed back from the working area to the storage system once the process of loading or unloading has been completed. In the packing station, a dispatch palette is provided where the piece goods are stacked on. The manipulation of the piece goods between tray and packing station can be assisted by a sliding surface unit by meeting particular ergonomic requirements.

SUMMARY OF THE INVENTION

The objective of the present invention is to propose an order-picking station having a compact design and a method for picking articles from source loading aids, which order-picking station and method allow a very efficient and ergonomic order-picking.

The objective of the invention is achieved due to the fact that the control device coordinates the conveying movements of the source loading aids and the destination loading aids in tune with each other in such a way that the source loading aid and the destination loading aid respectively required for performing a picking order prior to the picking process are merged in the picking station on a common picking conveyor of the first conveyor system passing through a working area for the order picker, and are presented to the order picker arranged next to one another as a picking group on the picking conveyor. The objective of the invention is also achieved due to the fact that the order-picking station is suitable for implementing the method according to one of claims 1 to 11.

The source loading aids contain articles of one type. A first source loading aid, for example, contains article "A", a second source loading aid contains article "B", etc. It is also possible that separating walls divide a source loading aid into several compartments which can receive different articles "A", "B", in which case the first compartment can receive an article "A" and a second compartment can receive an article "B".

An article to be picked is placed in the destination loading aid according to a picking order. A picking order can either comprise one or several different articles which are then placed in the destination loading aid. The order picker takes different articles from either one single source loading aid containing different types of articles in the non-mixed compartments or from several source loading aids each containing one single type of article.

The order picker is exactly instructed on the articles to be picked from which source loading aids or compartments. The order picker is also instructed on the number of articles to be picked from one or several source loading aids. The picking instruction can be presented to the order picker at an output unit having an optical display, such as "pick-to-light" display or monitor, and/or by means of an audible signal.

The picking conveyor extends as an uninterrupted conveying track between an infeed section, where the source loading aids and the destination loading aids are transferred onto the picking conveyor, and an outfeed section, where the source loading aids and the destination loading aids are discharged from the picking conveyor. The working area, which is designed across a length section of the picking conveyor, is situated between the infeed section and the outfeed section. In conveying direction of the picking conveyor, the working area forms at least one first picking position for a source loading aid and at least a second picking position for a destination loading aid arranged one behind the other. Thus, the picking positions for the source and destination loading aids are formed by and on the picking conveyor. Likewise, the picking conveyor is designed for performing the preferably automated common (cycled) conveying movement of the source and destination loading aids from the infeed section to the picking positions and away from the picking positions to the outfeed section.

It is not required to provide an additional buffer for destination loading aids underneath the picking conveyor. The order-picking station consequently comprises one single picking conveyor exclusively.

It is also of advantage that the picking conveyor can be realized by a standardized conveying technology which can be operated in a very flexible and performance-adjusted way.

It is possible for the source and destination loading aids to be transported at a low mutual distance or lined up close together along the picking conveyor. This allows particularly short picking distances between the source and destination loading aid when those are provided at the picking positions. Thereby the picking efficiency is increased. It is likewise possible that the picking orders are handled at a higher throughput rate if the source and destination loading aids are provided on the picking conveyor, as the latter are collectively conveyed through the order-picking station as a picking group. It is furthermore possible to avoid that the source and destination loading aids have to be switched or tilted to overcome different height or inclined levels and suchlike, so that the source and destination loading aids can be transported very quietly.

The source and destination loading aids can be provided at the picking positions in any order. Once one source loading aid and one destination loading aid are present in the picking group, the source loading aid can be provided at the front picking position relative with respect to the conveying direction and the destination loading aid can be provided at the rear picking position relative with respect to conveying direction or vice versa. The same applies if one source loading aid and two destination loading aids or two source loading aids and one destination loading aid are present in the picking group. If the picking group contains two source loading aids and two destination loading aids, these can be provided at the picking positions in turns or grouped on a source loading aid and destination loading aid basis. This shows that there is a high flexibility in supplying and picking source and destination loading aids. This allows a "performance-adjusted" and "ergonomic" picking.

It is also advantageous if the source loading aids and the destination loading aids are merged onto the common picking conveyor in an infeed section upstream of the picking station according to a picking order. In an outfeed section following the order-picking station, the source loading aids and destination loading aids are conveyed onto the second conveying system in a separated manner, in particular a delivery conveyor system comprising the second conveyor system and a storage return conveyor or disposal conveyor system. The spatial separation of the infeed section from the working area creates an ergonomic working environment for the order picker. Source loading aids still containing articles when the picking operation has been completed are separated by the storage return conveyor system and returned to the article warehouse separated from the destination loading aids.

According to a feature of the invention, the source loading aids and/or the destination loading aids are provided on a transport conveying device, which is connected to the picking conveyor upstream of the order-picking station, and transferred onto the picking conveyor in an amount which corresponds to the picking orders. This ensures that the order-picking station is supplied with source loading aids and/or destination loading aids without interruption, as a result of which a high throughput rate is guaranteed at the order-picking station.

It is also advantageous if the source loading aids are each moved past a detection device via a data carrier disposed on them and are identified by the electronic control unit on the basis of the data carrier, before the destination loading aids are transferred onto the picking conveyor. On the basis of the identification of each source loading aid upstream of the infeed section, the source loading aids can be assigned to the picking orders recorded in the control device, and the control device correspondingly determines how many articles are required for each picking order. On the basis of the identification, the control device also knows which source loading aid contains which article and computes the number of required destination loading aids. The control device can therefore determine on the one hand, how many destination loading aids and on the other hand, how many source loading aids are required. In the light of the above, the control device can coordinate the conveying movement and/or the supply of source loading aids and destination loading aids.

Once the source loading aid has been identified, the control device determines the number of destination loading aids required for a picking order thereto assigned and the corresponding number of destination loading aids is transferred onto the picking conveyor and conveyed on the picking conveyor together with the source loading aids, wherein the source loading aid and the number of destination loading aids form the picking group. The source loading aids are previously conveyed on the transport conveying device until they are in front of the infeed section, which is arranged between the transport conveying device and the picking conveyor, and a gap distance of such a size is formed in the infeed section, e.g. between source loading aids following one another, that a corresponding number of destination loading aids can be moved into the gap between the source loading aids.

If a picking order requiring different articles from different source loading aids has been entered, it is advantageous if the control device, once a first source loading aid for a picking order assigned to the latter has been identified, determines at least a second source loading aid for this picking order as well as a number of destination loading aids required, wherein the first source loading aid, the second source loading aid and the number of destination loading aids are jointly conveyed on the picking conveyor, wherein the source loading aids and the number of destination loading aids form the picking group. It is possible that only one single destination loading aid or several destination loading aids are required. The order picker can pick the articles required for a picking order from the source loading aids and place them into the destination loading aid(s).

If each of the destination loading aids is also moved past a detection device via a data carrier disposed on them before being transferred, and the control device identifies the destination loading aids on the basis of the data carrier, at least one destination loading aid can be assigned a picking order.

If the source loading aids and/or the destination loading aids are provided upstream of the infeed section on a transport conveying device in a sequence determined by the picking orders, it is possible that also a picking order comprising a large number of different articles is processed in a very simple way.

If—based on a possible feature—at least one destination loading aid in the working area of the order picker is discharged from the picking conveyor onto a laterally arranged parking station, which is connected to the picking conveyor in the working area, into at least one buffer position on a parking space, and transferred from the buffer position onto the picking conveyor again once at least one picking operation has been completed, it is possible for a picking order comprising a large number of different articles and accordingly a large number of destination loading aids to be picked on a working area which is small in terms of its spatial characteristics. The source loading aids, e.g. five source loading aids, pass the destination loading aid "temporarily parked" on the storage space one after another and made available on a picking station provided to be downstream relative to the parking station. It is alternatively possible that a first source loading aid is provided on a (first) picking position arranged to be downstream relative to the parking station and a second source loading aid is provided on a (second) picking position which is arranged to be upstream relative to the parking station. For picking, a picking position for the destination loading aid is left free between the picking positions for the source loading aids. Once the first "partial picking operation" has been completed, such as of one article "A" and one article "B", and if however also the articles "C" and "D" are needed in the destination loading aid, the destination loading aid is discharged to the parking station, the first and second source loading aid are dispatched. Subsequently, the third and fourth source loading aids are conveyed, and the third source loading aid passes the "temporarily parked" destination loading aid. Then, the second "partial picking operation" of article "C" and article "D" is carried out as previously described. The picking operation is repeated until all articles A to E" have been placed in the destination loading aid.

If—based on an embodiment—"flat" covers are mounted at a frame of the picking station so as to be displaceable above the picking conveyor and in its longitudinal orientation, which covers delimit a working area for the order picker, the latter can "focus" on the picking operation and his attention is not drawn off by the provisioning process of a new picking group. This allows an error-free or low-error picking.

The described picking station can advantageously be integrated in an automated storage system.

BRIEF DESCRIPTION OF THE DRAWINGS

For a better understanding of the invention the latter is explained in more detail with reference to the following Figures.

In a much simplified, schematic representation:

FIG. 2a, 2b is a perspective view illustrating sections of the conveyor systems for the source containers and destination containers as well as a first embodiment of an order-picking station of the order picking workstation;

FIG. 3a-3e shows a first embodiment for a supply process of source containers and destination containers as well as a picking operation in two successive steps;

FIG. 5a-5e shows a third embodiment for a supply process of source containers and destination containers in two successive steps;

FIG. 6 shows a plan view illustrating a second embodiment of an order-picking station;

FIG. 7 shows a plan view illustrating a third embodiment of an order-picking station;

DETAILED DESCRIPTION OF THE PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Also details relating to position used in the description, such as e.g. top, bottom, side etc. relate to the currently described and represented figure and in case of a change in position should be adjusted to the new position.

Hereafter, the invention will be described in connection with containers. The term "container" should not be seen as restrictive and is merely one example of a plurality of possible loading aids, such as, for example, trays, pallets, boxes, etc., which can be used as a means of storing and transporting articles and objects for picking.

Figure 1:
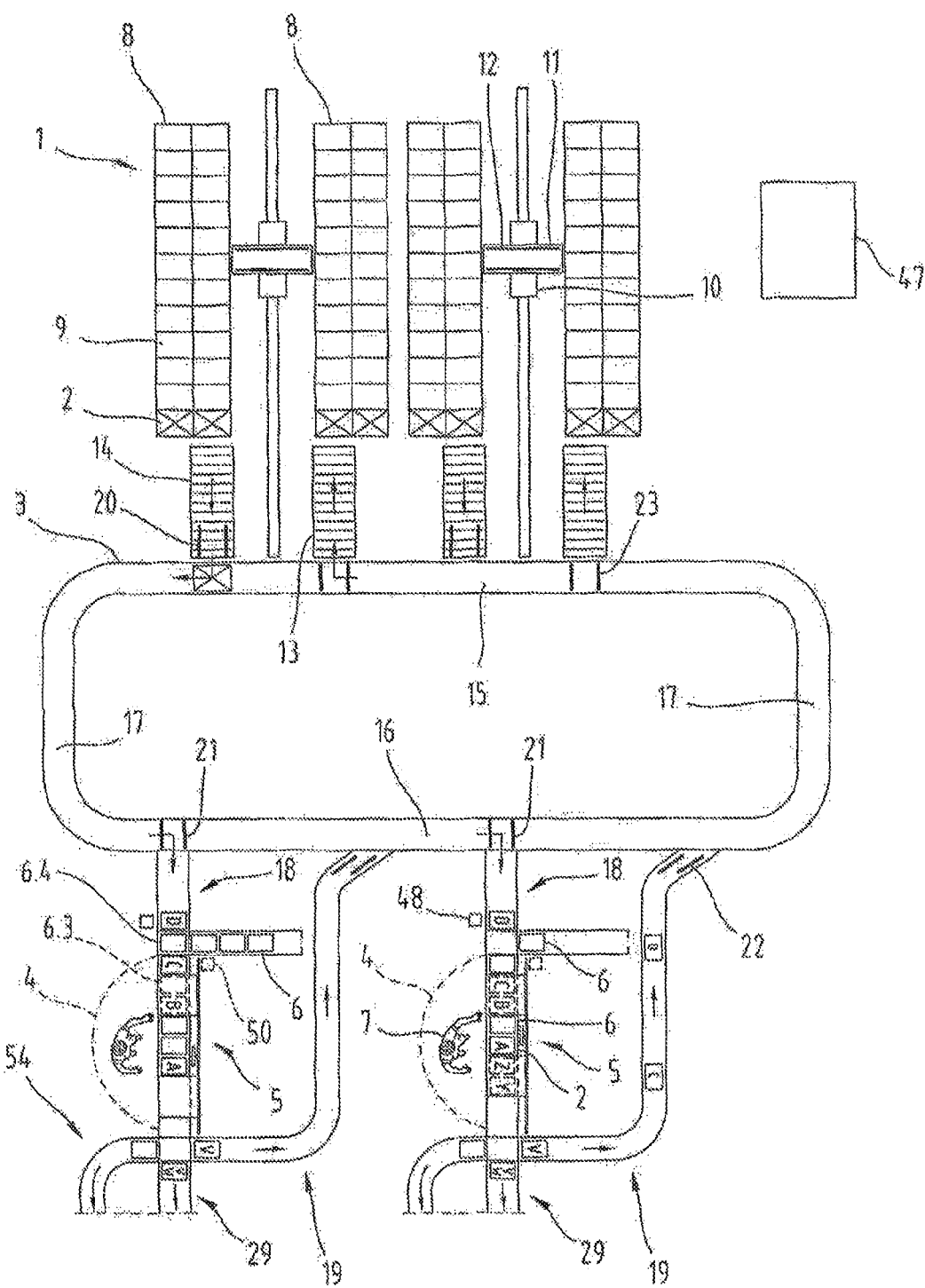
FIG. 1 shows a plan view illustrating a storage system with order picking workstations.

The storage system illustrated in FIG. 1 comprises an article warehouse 1, an automated conveyor system for storing source containers 2 in the article warehouse 1 or retrieving source containers 2 from the article warehouse 1, an automated distribution system 3, at least one order picking workstation 4 with an order-picking station 5 whereby articles can be picked from at least one source container 2 and placed in at least one destination container 6 by an order picker 7. The number of order picking workstations 4 may vary depending on the range of articles and/or the throughput rate.

If a particularly high throughput rate or picking efficiency is needed, the storage system may also have several picking workstations 4 each having an order-picking station 5 whereby articles can be picked from at least one source container 2 and paced in at least one destination container 6 by an order picker 7.

The article warehouse 1 has storage racks 8 disposed in parallel, in which the source containers 2 are stored in single-depth or, as illustrated, double-depth storage spaces 9 disposed one above the other at different shelf levels. Disposed between the storage racks 8 in each case is a rack aisle in which at least one computer-controlled stacker vehicle 10 can be displaced on rails. In the embodiment illustrated, the stacker vehicle 10 is equipped with a vertical mast, a platform 11 mounted on the vertical mast so that it can be raised and lowered and with a schematically indicated load-carrying device 12 by means of which the source containers 2 can be stored and retrieved. Every stacker vehicle 10 services two oppositely lying storage racks 8.

Based on another embodiment (not illustrated), the article warehouse 1 may have guide rails affixed respectively to the storage racks 8 at the shelf levels and extending along the rack aisle, and autonomous single-level shelf-servicing devices (shuttles) in at least some of the shelf levels which can be displaced on the guide rails in order to transport the source containers 2 to the storage spaces 9, and the single-level shelf-servicing device is equipped with the load-carrying device 12 by means of which the source containers 2 can be stored and retrieved. The single-level rack serving device forms the stacker vehicle.

At its terminal end, the rack aisle is provided with a goods-in conveyor 13 and a goods-out conveyor 14, which run in the extension of the storage racks 8. On the goods-in conveyor 13, for example a roller conveyor, belt conveyor and such like, source containers 2 are brought in and then transferred to the stacker vehicle 10.

On the goods-out conveyor 14, for example a roller conveyor, belt conveyor and such like, source containers 2 that were previously transferred by the stacker vehicle 10 to the goods-out conveyor 14 are dispatched.

The order picking workstation 4 and/or the order picking workstations 4 are connected to the article warehouse 1 via the automated first distribution system 3. The distribution system 3 comprises a circulating conveyor with straight conveyor sections 15, 16 extending perpendicular to the rack aisles conveying in opposite directions, and conveyor sections 17 connecting the latter at the end. The circulating conveyor is provided in the form of a roller conveyor, belt conveyor, chain conveyor and similar, for example.

The goods-in and goods-out conveyors 13, 14 adjoin the first conveyor portion 15 of the distribution systems 3. The respective picking workstation 4 and/or the respective order-picking station 5 is connected to the distribution system 3, in particular the second conveying track section 16, via an automated removal conveyor system 18 for those source containers 2 which are requested from the article warehouse 1 for carrying articles A, B, C, D, etc. required for a picking order, and an automated storage return conveyor system 19 for those source containers 2 which are still partially filled with articles A, B, C, D, etc. once a picking operation has been completed.

The source containers 2 needed for a picking order and conveyed on the first distribution system are temporarily removed from the article warehouse 1 and automatically transferred to the distribution system via an infeed diverter device 20. Then, the source container 2 is conveyed by the distribution system 3 and at the respective picking station 5 it is automatically transferred by the distribution system 3 onto the removal conveyor system 18 via an outfeed diverter device 21.

Still partially filled source containers 2 are temporarily automatically transferred from the storage return conveyor system 19 to the distribution system 3 via an infeed diverter device 22. Then, the source container 2 is conveyed by the distribution system 3 and at the respective goods-in conveyor 13 it is automatically transferred by the distribution system 3 onto the goods-in conveyor 13 via an outfeed diverter device 23.

FIGS. 2a and 2b illustrate the order picking station 5 which is connected to the conveyor systems 18, 19 for transporting the source and order containers 2, 6 to the picking station 5 and for transporting the source and order containers 2, 6 away from the order picking station 5.

The conveyor system 18 comprises a transport conveying device 24 for source containers 2 and an automated picking conveyor 25 for source and destination containers 2, 6, and on the one hand, in an infeed section 26 a transport conveying device 27 for destination containers 6 to be picked are arranged to adjoin the conveyor system 18, and on the other hand, in a outfeed section 28, the storage return conveyor system 19 as well as an automated delivery conveyor system 29 for completed destination containers 6' are arranged to adjoin the conveyor system 18. The delivery conveyor system 29 may lead to a consolidation storage (not illustrated) or a goods-out area (not illustrated). It is also possible that a disposal conveyor system 54 is connected to the conveyor system 18 in an outfeed section 28.

The infeed section 26 wherein the destination container 6 to be picked can be transferred onto the picking conveyor 25 by the transport conveying device 27, is provided to be upstream of the picking station 5, so that exclusively the picking conveyor 25, where both the source containers 2 and the destination containers 6 are conveyed on, extends through the working area 30 of an order picker 7 (FIG. 1). The working area 30 may be defined by an arm-length of the order picker 7, in which case the order picker 7 works in the working area 30. The picking conveyor 25 crosses the working area 30.

Thus, the picking conveyor 25 extends through the working area 30 between the infeed section 26 and the outfeed section 28. This allows that the source container 2 and the destination container 6 are transported together in cycles.

For picking, the order picker 7 is provided with the source container 2 in a picking position for source containers 2 and with the destination container 6 in a picking position for destination containers 6. At the picking position for source containers 2, articles can be removed from the source containers 2. At the picking position for destination containers 6, articles can be removed from the destination containers 2.

According to the embodiment shown, an infeed diverter device 31 is used for conveying and transferring the source containers 2 and the destination containers 6 to be picked onto the picking conveyor 25. The infeed diverter device 31 incorporates rollers 32 which are mounted a horizontal axis as to be rotated and at least some of said rollers 32 are driven and which rollers 32 are mounted in a frame 33 around a vertical axis so as to be pivoted and coupled with a rotary actuator (not shown). The rollers 32 can be swiveled by 90° between a first pick-up position having a conveying direction running parallel with the conveying direction 34 of the transport conveying device 24 and a second pick-up position running parallel with the conveying direction 35 of the transport conveying device 27.

An embodiment shown as an example for a infeed diverter device 31 and the constructional design of the infeed diverter 31 are disclosed in the Austrian Patent application A 1211/2010.

It is however also possible to use a not shown embodiment of an infeed diverter device for conveying and feeding the destination containers 6 to be picked, which infeed diverter device is provided in the form of a belt transfer unit which can be lifted and lowered between a conveying position above a horizontal conveying plane 36 and an initial position underneath a conveying plane 36. The conveying plane 36 is formed by the picking conveyor 25. The belt transfer unit is integrated in the end side of the transport conveying device 27 for destination containers 6 and crosses the transport conveying device 24 for source containers 2. In such a case, the picking conveyor 25 is a roller conveying track, e.g.

It is alternatively possible that the infeed diverter device is provided in the form of a pusher which can be operated by means of an actuator drive, by means of which pusher a destination container 6 can be transferred from the transport conveying device 27 onto the picking conveyor 25.

It is however also possible to use a separating device (not illustrated) on the conveyor system 18 for conveying and feeding the destination containers 6 to be picked. In this case, the source container transport conveying device 24 and the picking conveyor 25 form a continuous conveying track, which can e.g. be designed as a roller track, and the source container transport conveying device 24, the picking conveyor 25 and the infeed section 26 arranged between the latter each form conveying segments, which can be operated at a varying conveying speed. The source containers 2 can be such accelerated or decelerated that a gap 37 (FIG. 2b) can be set in the sequence of the source containers 2. This gap 37 or the gap distance between source containers 2 following one another is of such a size that a destination container 6 can be transferred between the source containers 2 from the destination container transport conveying device 27 onto the conveying track or the picking conveyor 25.

The source container transport conveying device 24, the picking conveyor 25 and the destination container transport conveying device 27 are accumulating tracks (buffer tracks) and provided in the form of accumulation roller conveyors, accumulation band conveyors and suchlike, in which case the accumulating tracks each form a number of accumulation positions one behind the other in conveying direction 34, 35, 38. Each accumulation position is of such a dimension that there is enough space to place a source container 2 or a destination container 6 on it. In the working area 30 each accumulation position forms a picking position for the source container 2 or the destination container 6. Accumulation roller conveyors comprising several conveying rollers per accumulation position are preferred for use, and at least one of the conveying rollers per accumulation position is a motorized roller.

Also the storage return conveyor system 19 and the delivery conveying system 29 can be designed as accumulating tracks (buffer tracks) and provided in the form of accumulation roller conveyors, accumulation band conveyors and suchlike, in which case the accumulating tracks each form a number of accumulation positions one behind the other in conveying direction 39, 40, as described above.

The source container transport conveying device 24, the picking conveyor 25, the destination container transport conveying device 27, the storage return conveyor system 19, the delivery conveying system 29 and/or the disposal conveying system 54 are driven in order to allow that the containers are exchanged and/or transported to and away from the order picking workstation 5 automatically.

As may be seen also from FIG. 2a, the order-picking station 5 comprises at least one input unit 41 and at least one output unit 42. The input unit 41 is a keyboard or confirm key, for example, by means of which the end of a picking operation can be confirmed. The output unit 42 comprises a visual and/or acoustic display, for example a monitor, by means of which the number of articles to be taken out of the source containers 2 can be displayed.

Figure 3A:
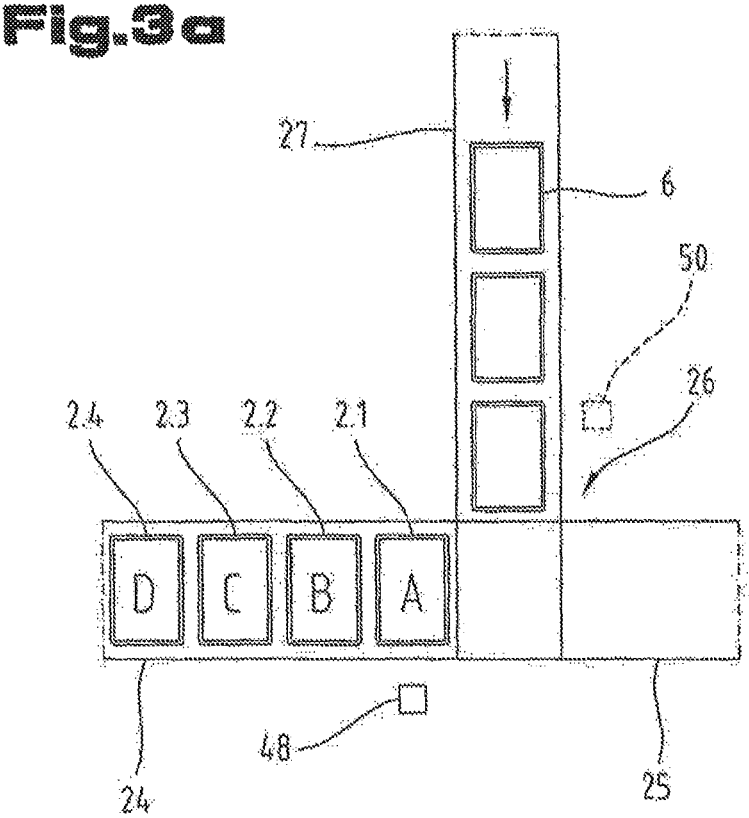
Figure 3B:
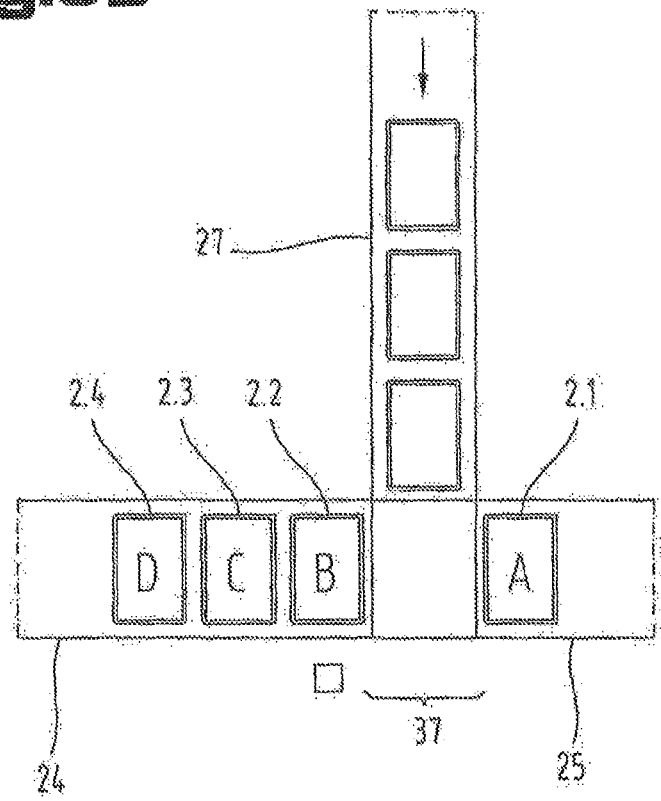

Once the picking operation has been completed, the source and destination containers, 2, 6 are conveyed away from their picking positions 52a, 52b (FIG. 3e) on the picking conveyor 25 in conveying direction 38 and outside of the working area 30 they are discharged from the picking conveyor 25 onto the delivery conveying system and either onto the storage return conveyor system 19 or optionally—if present—a disposal conveying system 54.

The disposal conveying system 54 is connected to the picking conveyor 25, preferably in the outfeed section 28 and serves to convey from the working area 30 the emptied source containers 2' from which all the articles have been removed after at least one picking operation. Emptied source containers 2' may also be used as destination containers 6, in which case they are automatically or manually conveyed to the transport conveying device 27.

The storage return conveyor system 19 is connected to the picking conveyor 25, preferably in the outfeed section 28 and serves to convey source containers 2 still containing articles after one picking operation from the working area 30 to the distribution system 3 from where they are conveyed back to the article warehouse 1.

The delivery conveying system 29 is connected to the picking conveyor 25, preferably in the outfeed section 28 and serves to convey fully picked source containers 6' away from the working area 30 to a (not illustrated) consolidation storage or a (not illustrated) goods-out area.

According to the embodiment shown, an outfeed diverter device 43 can be used for conveying and discharging the source containers 2; 2' or destination containers 6; 6'. As described above, the outfeed diverter device 43 comprises rollers 32 which are mounted around a horizontal axis so that they can rotate, and at least some of the rollers are driven reversibly and mounted in a frame around a vertical axis so as to swivel and coupled with a swivel drive (not illustrated). The rollers 32 can be swiveled by 90° between a first pick-up position having a conveying direction running parallel with the conveying direction 38 of the picking conveyor 25 and a second pick-up position running parallel with the conveying direction 39, 44 of the storage return conveyor system 19 and/or optionally the disposal conveyor system 54. Changing the direction of rotation of the rollers 32 causes that a source container 2; 2' can either be conveyed onto the storage return conveyor system 19 or optionally the disposal conveying system 54.

The outfeed diverter device 43 has the same technical implementation as the infeed diverter device.

It is however also possible to use not shown embodiment of an outfeed diverter device for conveying and discharging the source and destination containers 2, 2', 6', which outfeed diverter device is provided in the form of a belt transfer unit which can be lifted and lowered between a conveying position above a horizontal conveying plane 36 and an initial position underneath a conveying plane 36.

Alternatively, the outfeed diverter device may also be provided in the form of pushers which can be operated by means of actuator drives, by means of which a source and destination container 2, 2', 6' can be discharged from the picking conveyor 25 onto the delivery conveying system 29, the storage return conveyor system 19 and/or optionally the disposal conveying system 54.

It is furthermore possible that the order-picking station 5 comprises "planar" covers 46 which are mounted to a stationary frame 45 above the picking conveyor 25 and in its longitudinal orientation so as to be displaceable, and which covers delimit a working area 30 for the order picker 7. Each cover 46 can cover at least two or three containers completely. For this purpose, a not illustrated actuator drive is provided, which is connected to a control device 47 (FIG. 1). The distance between the covers varies depending on the number of source containers 2 and destination containers 6 provided in the working area 30 on the accumulation positions and/or the picking positions 52a, 52b, 52c, etc. The control device 47 comprises a material flow computer. Picking orders can be electronically recorded in the control device 47.

In order to identify source containers 2 to be transferred or conveyed into the picking conveyor 25, a detection device 48 (FIGS. 1, 3, 4 and 5) is additionally arranged along the transport conveying device 24 so as to be upstream relative to the infeed section 26. Each source container 2 has the identification system which comprises at least one data carrier 49 (FIG. 2). The data carrier 49 can be provided in the form of a bar code mark, a transponder, a magnetic strip or an RFID mark (radio frequency identification device) and it is preferred if machine-readable data are stored in the data carrier.

In order to identify destination containers 6 to be transferred or conveyed into the picking conveyor 25, it is also possible that a detection device 50, as exclusively shown in FIGS. 1, 3, 4 and 5 by dotted lines, is arranged along the transport conveying device 27 so as to be upstream relative to the infeed section 26. Each destination container 6 has an identification system which comprises at least one data carrier 51 (FIG. 2). The data carrier 51 can also be provided in the form of a bar code mark, a transponder, a magnetic strip or an RFID mark (radio frequency identification device) and it is preferred if machine-readable data are stored in the data carrier.

The detection device 48, 50 may be provided in the form of reading devices, by means of which data can be read from an identification system. It is in particular possible to clearly identify the source containers 2 and/or destination containers 6. The detection device 48, 50 is connected with the control device 47.

FIGS. 3a to 3e describe a first embodiment of a process of picking and supplying source containers 2 and/or destination containers 6.

FIG. 3 shows source containers 2.1, 2.2, 2.3, 2.4 on the transport conveying device 24 and destination containers 6 on the transport conveying device 27.

The source containers are conveyed from the article warehouse 1 via the distribution system 3 and optionally sorted in a sequence needed and preferably provided on the accumulation positions at a distance to one another in a row. The provision of the source containers 2 is carried out on the basis of the picking orders. For a picking order recorded in the control device 47, one or more source containers 2 are provided. It is preferred if each source container 2 contains articles of one type, e.g. source container 2.1 contains article "A", source container 2.2 contains article "B", etc.

The destination containers 6 are preferably arranged on the accumulation positions at a distance to one another so that they form a row. If parts of the order picking have already been placed in the destination containers 6, the destination containers 6 must also be sorted in the sequence needed.

Even before an empty or partially picked destination container 6 is conveyed in the infeed section 26 onto the picking conveyor 25, it is possible to identify the source container 2.1 by reading the data on the data carrier 49 (FIG. 2) by means of the detection device 48 and by the detection device 48 transmitting a corresponding signal to the control device 47, so that the control device 47 can identify the source container 21. The data are e.g. unambiguous loading aids identification numbers. On the basis of the loading aids identification number, the control device 47 can clearly assign a source container 2.1 to a picking order and/or an article (picking load) in the source container 2.1.

On the basis of the identification of the source container 2.1, the control device 47 can clearly assign an (electronically recorded) picking order to this source container 2.1. For this picking order, the control device 47 also determines the number of destination containers 6 required.

According to the variant of embodiment in FIG. 3, one single destination container 6 is required for one source container 2.1, and consequently one or more articles "A" are removed from the one source container 2.1 and placed in the destination container 6.

Figure 3C:
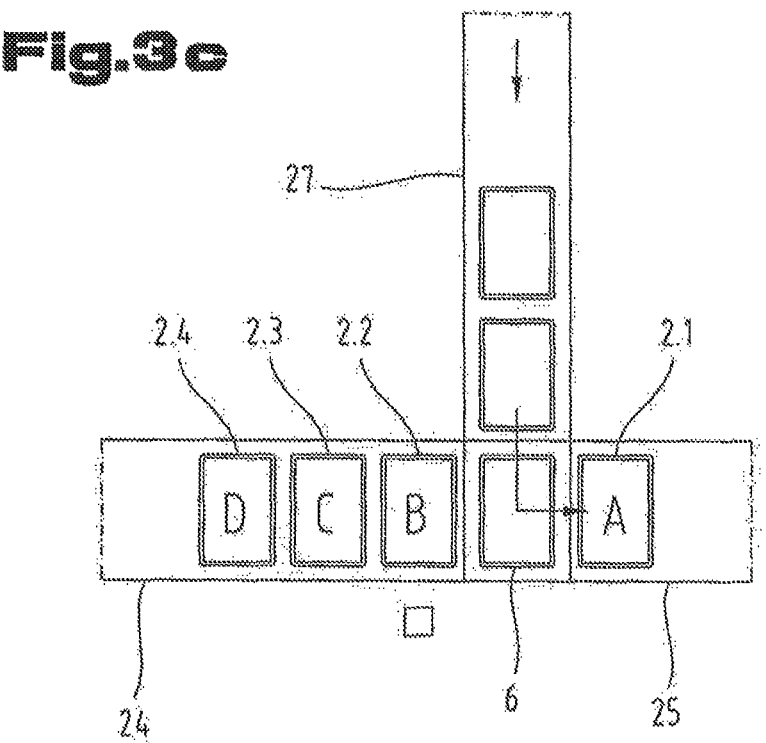
Figure 3D:
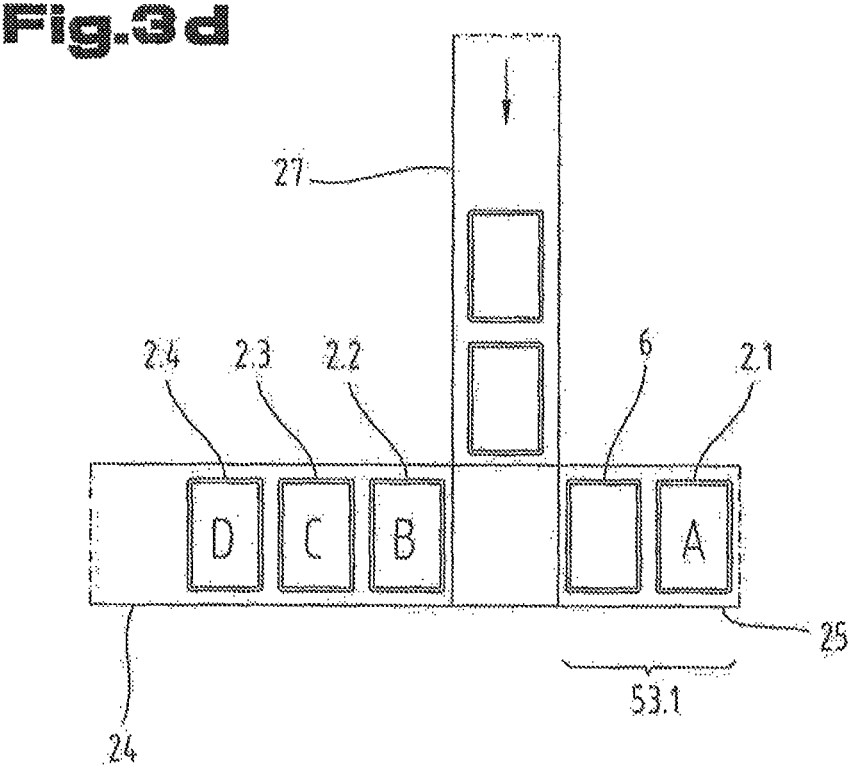

According to the required and determined number of destination containers 6, the infeed diverter device 31 (FIG. 2a) produces a gap 37 between the source containers 2.1, 2.2 following one another, as illustrated in FIG. 3, in which gap 37 the destination container 6 is transferred, as illustrated in FIG. 3c, in order for the destination container 6 to be conveyed on the picking conveyor 25 together with the source container 2.1 to the working area 30 and/or the picking positions 52a, 52b placed one after another in conveying direction 38 in the working area 30, as illustrated in FIG. 3d.

As may be seen from the above, the source container 2.1 is conveyed from the transport conveying device 24 onto the picking conveyor 25 via the infeed section 26, whilst the destination container 6 is transferred from the transport conveying device 27 onto the infeed section 26, from where it is conveyed onto the picking conveyor 25.

If the source container 2.1 and destination container 6 are present in the working area 30 and/or at the picking positions 52a, 52b in the working area 30, the order picker 7 (FIG. 1) can carry out the picking operation and remove one or more articles "A" from the source container 2.1 and place it/them in the destination container 6 as may be seen from FIG. 3e. More source containers 2 and destination containers 6 are illustrated in FIG. 3e, which containers are associated to other picking orders.

While the source container 2.1 and destination container 6 forming a picking group 53.1 (FIG. 3e) are conveyed on and by the picking conveyor 25 to the working area 30, the next picking group 53.2 is already formed from the source containers 2.2., 2.3 and the destination containers 6 and/or source container 2.4 and destination container 6 according to the manner described above and conveyed to the working area 30 one after the other.

On the basis of the number of source and destination containers 2, 6 determined by the control device 47 the covers 46 are displaced parallel to the longitudinal direction of the picking conveyor 25 so far that a working area 30 is delimited between them, which size is at least twice the width of a source container 2 or destination container 6, as also illustrated in FIG. 3e.

For the picking operation, the order picker 7 is presented with a display on the output unit 42 indicating the quantity to be picked and on this basis the order picker 7 removes the corresponding quantity of articles "A" from the source container 2.1 and places it in the destination container 6. The order picker 7 confirms the end of the picking operation at the input unit 41.

Once the picking operation has been completed, the source container 2.1 and the destination container 6 are discharged from the working area 30 on and by the picking conveyor 25. At the outfeed section 28 the source container 2.1 still containing articles "A" is discharged onto the storage return conveyor system 19 or otherwise, if completely emptied, discharged onto the disposal conveying system 54. The fully picked destination container 6' containing article "A" is conveyed onto the delivery conveying system 29. This is, however, only illustrated by means of the source and destination containers 2, 2', 6' containing articles "V", "V, W", and thus for a picking group from a prior picking operation.

FIGS. 4a-4d shows a second embodiment for picking and making available source containers 2 and/or destination containers 6 and differs from the operation of picking and providing according to the FIGS. 3a-3e only to the extent that the picking group 53.3 comprises one source container 2.1 and two destination containers 6.1, 6.2. The source container 2.1 contains the articles "A", which are to be picked into both, the first destination container 6.1 and the second destination container 6.2. According to a first embodiment the destination containers 6.1, 6.2 can only belong to one picking order or, according to a second embodiment, the first destination container 6.1 can belong to a first picking order and the second destination container 6.2 can belong to a second picking order.

Even before an empty or partially picked destination container 6 is conveyed in the infeed section 26 onto the picking conveyor 25, it is possible to identify the source container 2.1 by reading the data on the data carrier 49 (FIG. 2) by means of the detection device 48 and by the detection device 48 transmitting a corresponding signal to the control device 47, so that the control device 47 can identify the source container 21, as described above.

On the basis of the identification of the source container 2.1, the control device 47 can clearly assign an (electronically recorded) picking order to this source container 2.1. For this picking order, the control device 47 also determines the number of destination containers 6.1, 6.2 required for a picking order. It is alternatively also possible that the control device 47 analyzes from a number of picking orders recorded those picking orders which also require an article "A" from this source container 2.1.

According to the variant of embodiment in FIG. 4, two destination containers 6.1, 6.2 are required for one source container 2.1, and consequently a corresponding number of several articles "A" are removed from the one source container 2.1 in and placed in the destination containers 6.1, 6.2 in the working area 30.

Figure 4A:
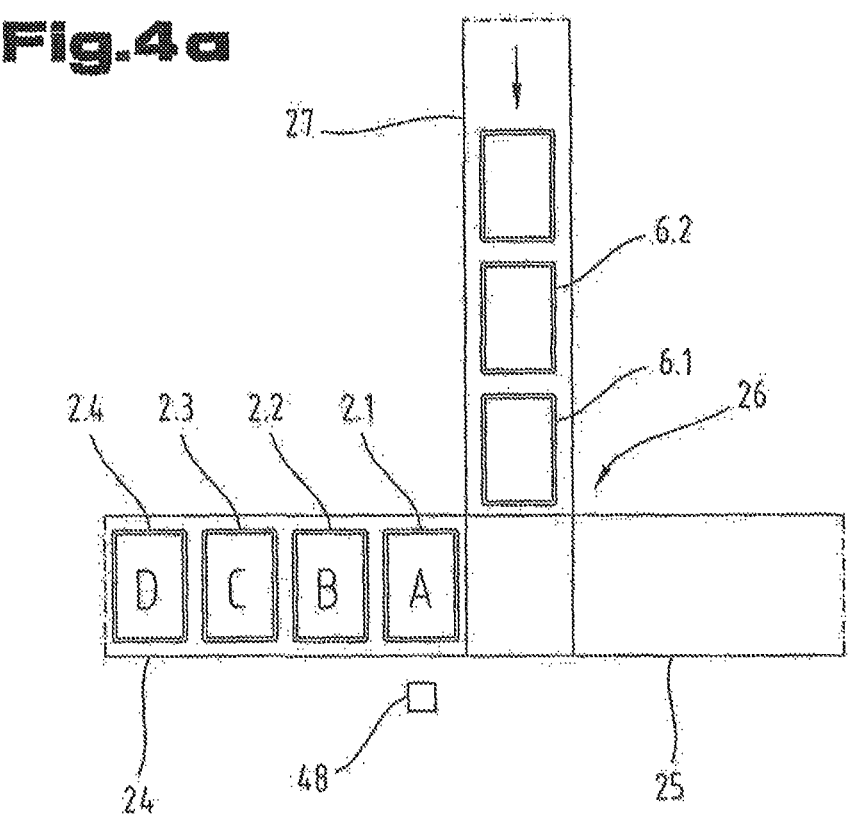
FIG. 4a-4d shows a second embodiment for a supply process of source containers and destination containers in two successive steps.
Figure 4B:
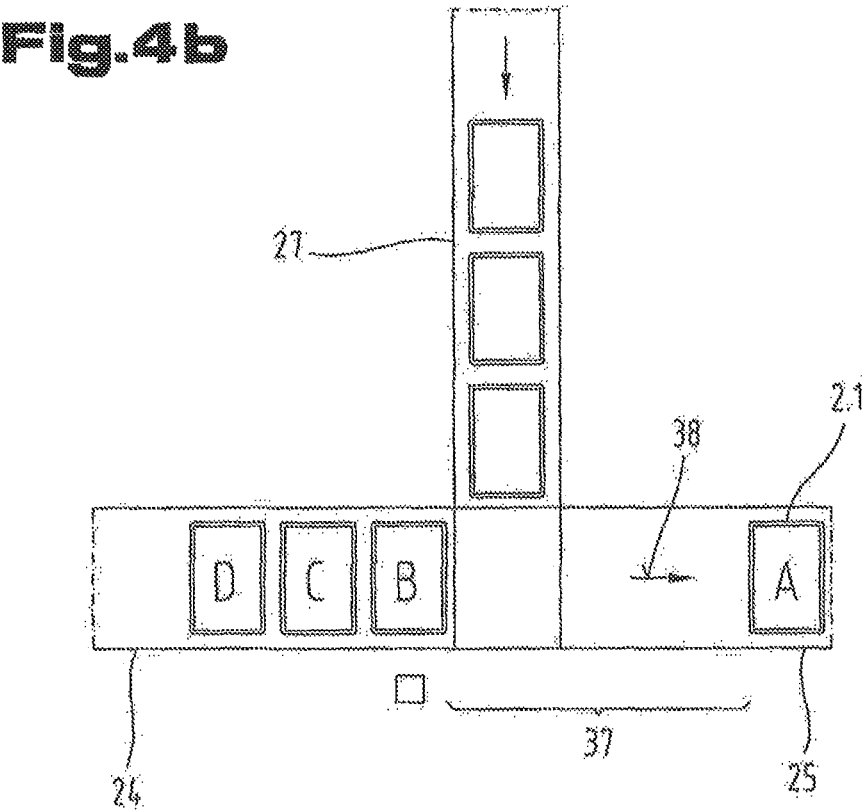
Figure 4C:
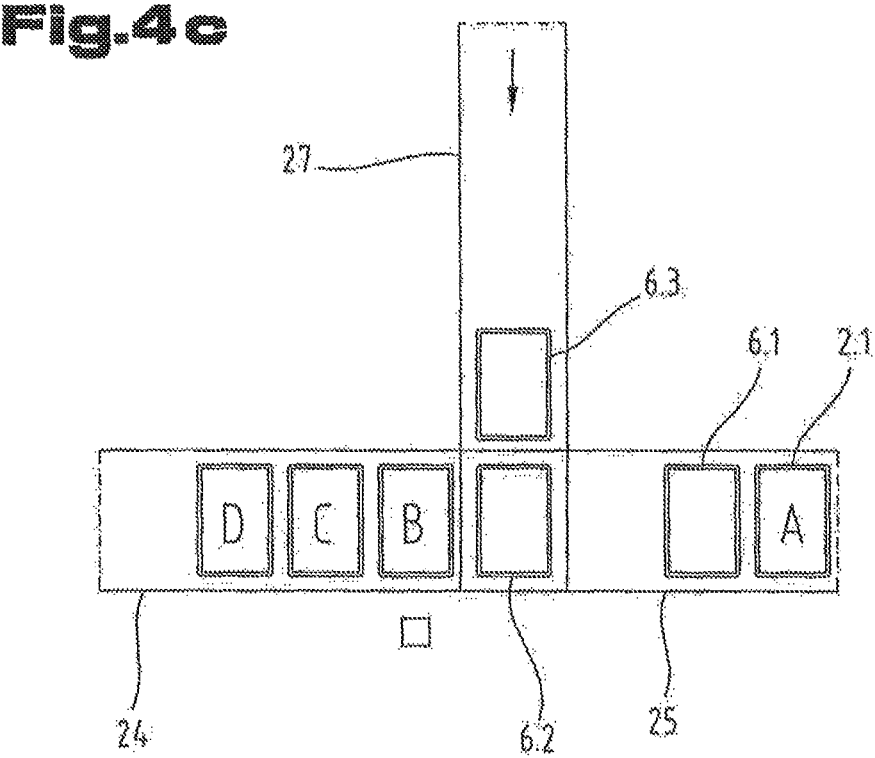
Figure 4D:
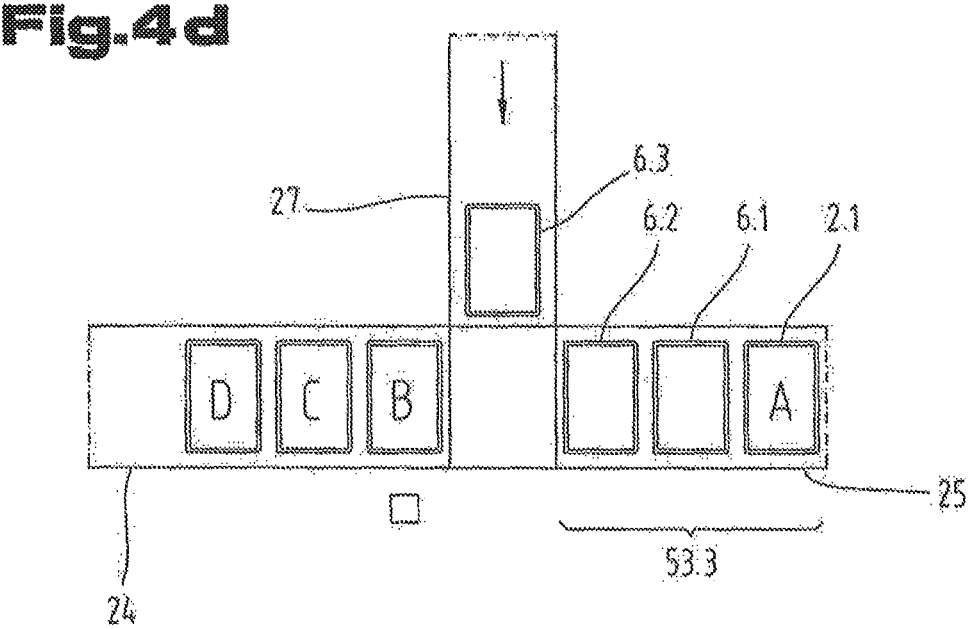

According to the required and determined number of destination containers 6, the infeed diverter device 31 (FIG. 2a) produces a gap 37 between source containers 2.1, 2.2 following one another, as illustrated in FIG. 4b, in which gap 37 the destination containers 6.1, 6.2 are transferred, preferably one after the other, or—even if not illustrated—simultaneously, as illustrated in FIG. 4c, in order for the destination containers 6 to be conveyed on the picking conveyor 25 together with the source containers 2.1 to the working area 30 and/or the picking positions 52a, 52b, 52c (not illustrated) placed one after another in conveying direction 38 in the working area 30, as illustrated in FIGS. 2a and 4d.

While the source container 2.1 and destination containers 6.1, 6.2 forming a picking group 53.3 (FIG. 4d) are conveyed on and by the picking conveyor 25 to the working area 30, the next picking groups 53.4 (not illustrated) are already formed from the source containers 2.2 and the destination container 6.3 and/or source container 2.3 and destination container 6.4 according to the manner described above and conveyed to the working area 30 one after the other, as may be seen from FIG. 1.

Once the picking operation has been completed, the source container 2.1 and the destination containers 6.1, 6.2 are discharged from the working area 30 on and by the picking conveyor 25. At the outfeed section 28 the source container 2.1 still containing articles "A" is discharged onto the storage return conveyor system 19 or otherwise, if completely emptied, discharged onto the disposal conveying system 54. The fully picked destination containers 6.1, 6.2 each containing the article "A" are discharged onto the delivery conveying system 29.

On the basis of the number of source and destination containers 2.1, 6.1, 6.2 determined by the control device 47 the covers 46 are displaced so far that a working area 30 is delimited between them, the size of which is at least three times the width of a source container 2 and/or destination container 6, as also illustrated in FIG. 2a.

FIGS. 5a-5d show a third embodiment for picking and making available source containers 2 and/or destination containers 6 and differs from the operation of picking and making available according to the FIGS. 3a-3e only to the extent that the picking group 53.5 comprises two source containers 2.1, 2.2 and one destination container 6. A particular ergonomic picking is allowed if the picking group 53.5 of destination containers 6 is positioned between the source containers 2.1, 2.2.

The source container 2.1 contains the articles "A", at least one article "A" of which is to be picked into the destination container 6, and the source container 2.2 contains the articles "B", at least one article "B" of which is to be picked into the same destination container 6. This illustrates that the destination container 6 to be picked for carrying out a picking order can contain articles "A, B" from different source containers 2.1, 2.2.

Even before an empty or partially picked destination container 6 is conveyed onto the picking conveyor 25 in the infeed section 26, the source container 2.1 can be identified by the control device 47 in the above-described manner.

On the basis of the identification of the source container 2.1, the control device 47 can call up a recorded picking order. For this picking order, the control device 47 determines the number of source containers 2 and destination containers 6 required.

According to the embodiment illustrated as an example in FIG. 5, a picking order requires articles from different source containers 2.1, 2.2, which can be placed in at least one destination container 6. Therefore, an article "A" and an article "B" are removed from the source containers 2.1., 2.2 in the working area 30 and placed in the destination container 6 in an appropriate number.

Figure 5A:
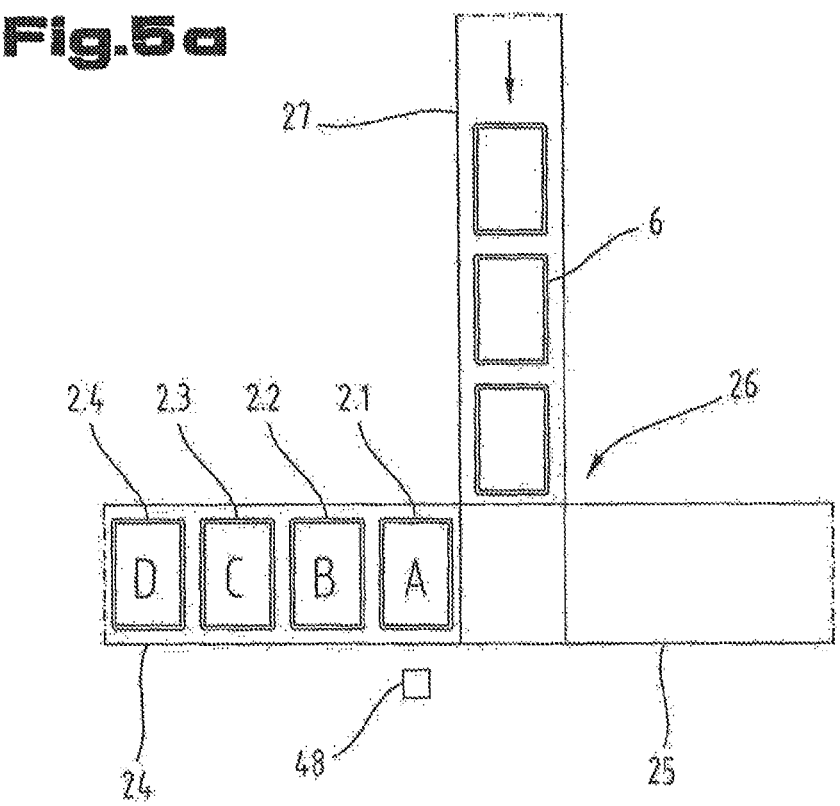
Figure 5B:
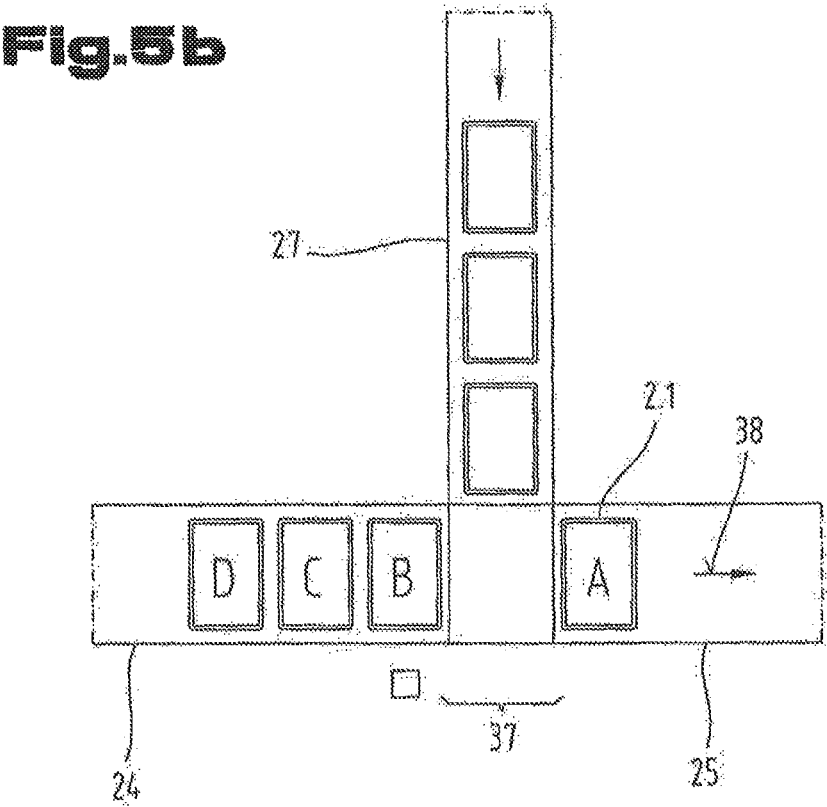
Figure 5C:
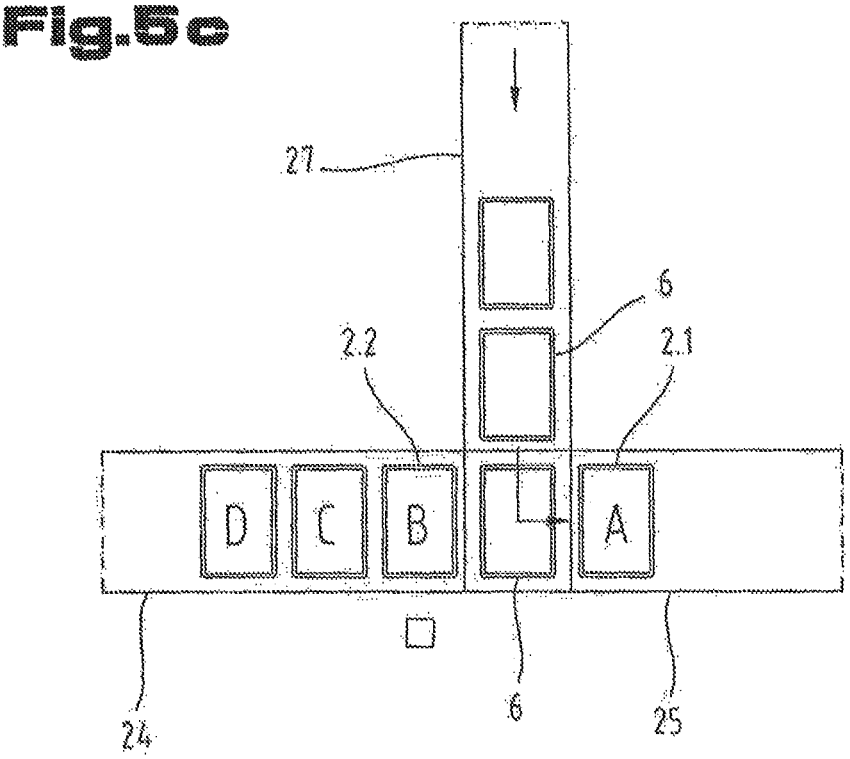
Figure 5D:
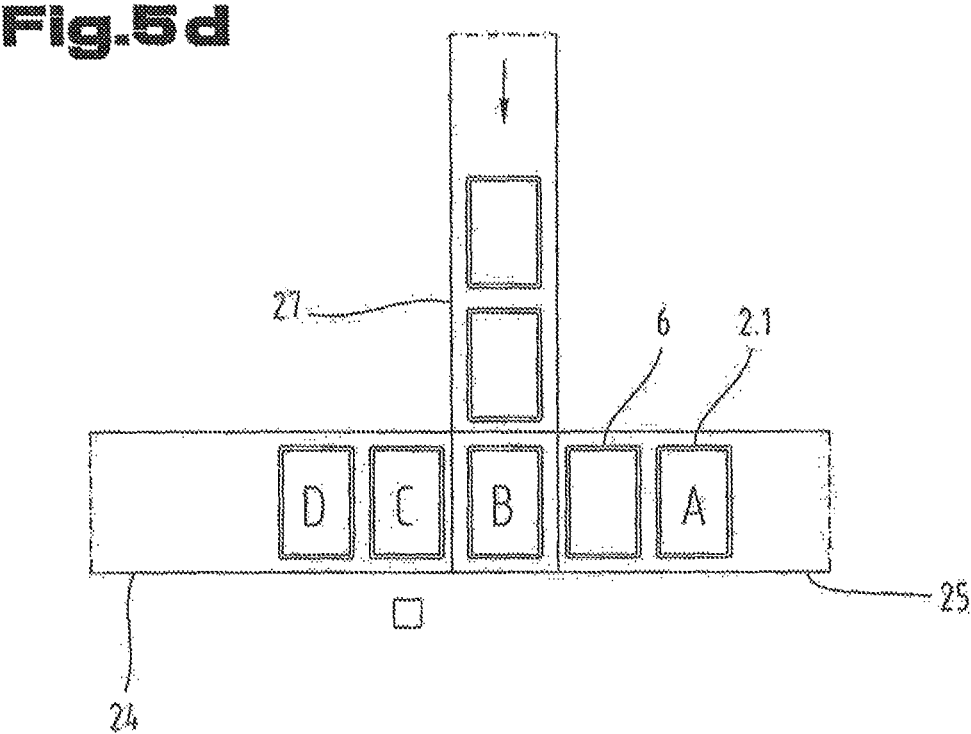

According to the determined and required number of destination containers 6, the infeed diverter device 31 (FIG. 2a) produces a gap 37 between source containers 2.1, 2.2 following one another, as illustrated in FIG. 5b, in which gap 37 the destination container 6 is transferred, as illustrated in FIG. 5c. This being the case, the source container 2.1 is preliminarily conveyed onto the picking conveyor 25, the destination container 6 is positioned between the source containers 2.1, 2.2, the source containers 2.1, 2.2 and the destination containers 6 are jointly conveyed in conveying direction 38, so that the source containers 2.1, 2.2 and the destination container 6 are jointly conveyed as a picking group 53.5 to the working area 30 and/or to the picking positions 52a, 52b, 52c (not illustrated) lying one behind the other in conveying direction 38 in the working area 30, as may be seen in the FIGS. 5d and 5e.

According to this embodiment, it is required that the source containers 2.1, 2.2 are provided at the transport conveying device 24 in the (sorted) sequence required for the picking. The sorting can be carried out in the article warehouse 1, e.g. by means of the stacker vehicle 10 and/or a corresponding sorting device and/or the distribution system 3.

Once the picking operation has been completed, the source containers 2.1, 2.2 and the destination container 6 are discharged from the working area 30 on and by the picking conveyor 25. At the outfeed section the source containers 2.1, 2.2 still containing articles "A", "B" are discharged onto the storage return conveyor system 19 or otherwise, if completely emptied, discharged onto the disposal conveying system 54. The fully picked destination container 6' containing the articles "A and B" is conveyed onto the delivery conveying system 29.

FIG. 6 illustrates a segment of a modified embodiment of the order-picking station 5', which comprises a parking station 55 between the infeed section 26 and the outfeed section 28 in addition to the components described above. For reasons of clarity, the frames 45 and the covering elements 46 are not illustrated. The parking station 55 is connected to the picking conveyor 25 thereby forming a parking plane running preferably horizontally in the conveying plane 36 of the picking conveyor 25, on which parking plane at least a destination container 6 transported on the picking conveyor 25 can be discharged and transferred again after at least one picking operation. For this purpose, an infeed and/or outfeed section 56 is provided along the picking conveyor 25.

For conveying and transferring and/or discharging the destination container 6 to be picked, the embodiment illustrated provides that an automated infeed and/or outfeed diverter device 57 is used, which can be designed according to the infeed diverter device 31 described above. It is alternatively also possible that the order picker 7 manually carries out the transferring and/or discharging process.

The parking station 55 comprises at least one storage space 58 on which the destination container 6 can be discharged. It is alternatively also possible the several storage places 58 for destination container 6 are provided to be parallel with the picking conveyor 25. The storage space 58 can be designed on an automated conveyor device, the conveying direction of which extends perpendicular with respect to the picking conveyor 25.

Such an embodiment is mainly used if a picking order requires that a plurality of different articles "A to C" is placed in the destination containers 6. It naturally also possible that more than the three illustrated source containers 2.1 to 2.3 are provided for the picking order.

In such a case, the picking group is preliminarily formed in a manner as described above. According to the embodiment shown, this picking group comprises the source containers 2.1, 2.2, 2.3 and the destination container 6. In the infeed section 26, the destination container 6 is transferred into a gap 37 (not illustrated) between the source containers 2.1, 2.2. The source container 2.3 is arranged next to source container 2.2 and conveyed on the picking conveyor 25 to the working area 30 and/or to the picking positions 52a to 52d placed one after another in conveying direction 38 in the working area 30. The source container 2.1 is provided at the picking position 52a, the destination container 6 is provided at the picking position 52b, etc.

Once the first article "A" has been removed from the source container 2.1, available in the working area 30, and placed in the destination container 6, available in the working area 30 at the picking position 52b, the destination container 6 loaded with article "A" is discharged from the picking conveyor 25 in the infeed and/or outfeed section 56 onto the parking station 55. Thereupon, the source container 2.2 which is provided at the picking position 52c in the working area 30, and the source container 2.1 which is still provided at the picking position 52a are simultaneously conveyed to the outfeed section 28 in conveying direction 38. The source container 2.1 is here conveyed downstream relative to the picking position 52a in conveying direction 38, and the source container 2.2 is moved past the "temporarily parked" destination container 6 and conveyed up to the picking position 52a.

Thereupon, the destination container 6 is in the infeed and/or outfeed section 56 supplied from the parking station 55 to the picking conveyor 25 and afterwards provided at the picking position 52b, in order to allow a repeated picking. Now, second article "B" is removed from the source container 2.2, which is made available at the picking position 52a in the working area 30, and is placed in the destination container 6.

This process is repeated until all articles "A to C" have been placed in the destination container 6.

It is alternatively also possible that the articles "A and B" from the source container 2.1 provided at the picking position 52*a* downstream relative to the destination container 6 and from the source container 2.1 provided upstream to the destination container at the picking position 52*c* are temporarily placed into the destination container 6 placed between them at the picking position 52*b*. Thereupon, the destination container 6 is discharged onto the parking station 55 and the source container 2.2 is conveyed past the "temporarily stored" destination container 6. In this case, the source container 2.3 is e.g. conveyed to the picking position 52*a* and provided there. The destination container 6 is in turn transferred onto the picking conveyor 25, whereupon the article "C" is picked from the source container 2.3 downstream relative to the destination container 6 at the picking position 52*a* and placed therein.

The fully picked destination container 6 containing the articles "A to C" is then conveyed to the outfeed section 28 by the picking conveyor 25.

FIG. 7 illustrates a further embodiment of the picking station 5". As compared to FIG. 6, the parking station 55 is arranged on a side of the picking conveyor 25 facing the order picker 7 (FIG. 1). The process of picking as described in FIG. 6 is also possible on the basis of this embodiment.

Although the embodiments illustrated propose that the destination container 6 is transferred into the gap between source container 2, it is of course also possible that the destination container 6 is transferred until it is upstream of the first source container 2.1 Thus, the gap 37 is formed between the first source container 2.1 of a current picking order and a last source container 2 or destination container 6 of a past picking order.

Finally, it should be pointed out that the picking group can also comprise more than three containers, such as three source containers 2 and two destination containers 6 or the other way around. It is also possible to freely choose the sequence in which the destination containers 2, 6, are transported. It is possible that the first container which is conveyed in a picking group is a destination container 6, a second container is a source container 2 or the other way around. If there are several source and destination containers 2, 6 present in a picking group, it is also possible to convey the source and destination containers in turns.

The embodiments illustrated as examples represent possible variants of the picking method and the order-picking station 5, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the order-picking station 5, it and its constituent parts are illustrated to a certain extent out of scale and/or on an enlarged scale and/or on a reduced scale.

List of reference numerals

| | |
|---|---|
| 1 | article warehouse |
| 2 | source loading aid |
| 3 | distribution system |
| 4 | order picking workstation |
| 5 | order picking station |
| 6 | destination loading aid |
| 7 | order picker |
| 8 | storage rack |
| 9 | depositing area |
| 10 | stacker vehicle |
| 11 | platform |
| 12 | load receiving device |
| 13 | goods-in conveyor |
| 14 | goods-out conveyor |
| 15 | conveyor portion |
| 16 | conveyor portion |
| 17 | conveyor portion |
| 18 | removal conveyor system |
| 19 | storage return conveyor system |
| 20 | infeed diverter device |
| 21 | outfeed diverter device |
| 22 | infeed diverter device |
| 23 | outfeed diverter device |
| 24 | transport conveying device |
| 25 | picking conveyor |
| 26 | infeed section |
| 27 | transport conveying device |
| 28 | outfeed section |
| 29 | delivery conveyor system |
| 30 | working area |
| 31 | infeed diverter device |
| 32 | roller |
| 33 | frame |
| 34 | conveying direction |
| 35 | conveying direction |
| 36 | conveying plane |
| 37 | gap |
| 38 | conveying direction |
| 39 | conveying direction |
| 40 | conveying direction |
| 41 | input unit |
| 42 | output unit |
| 43 | outfeed diverter device |
| 44 | conveying direction |
| 45 | frame |
| 46 | cover |
| 47 | control device |
| 48 | detection device |
| 49 | data carrier |
| 50 | detection device |
| 51 | data carrier |
| 52 | picking position |
| 53 | picking group |
| 54 | disposal conveyor system |
| 55 | parking station |
| 56 | infeed and/or outfeed section |
| 57 | infeed and/or outfeed diverter device |
| 58 | storage space |

The invention claimed is:

1. A method for picking of articles from source loading aids by an order picker into destination loading aids at an order-picking station comprising:
   (a) conveying the source and destination loading aids via a first conveyor system to the order-picking station;
   (b) providing the source and destination loading aids at the order-picking station for picking the articles in a picking operation;
   (c) after the picking operation, discharging the source and destination loading aids from the order-picking station via a second conveyor system;
   (d) providing one common picking conveyor at the first conveyor system passing through a working area for the order picker;
   (e) coordinating conveying movements of the source and destination loading aids by a control device so that the source and destination loading aids required for processing a picking order are brought together before the picking operation in the order-picking station onto the one common picking conveyor of the first conveyor system and in such a manner that the source and destination loading aids are arranged next to one another in a conveying direction of the one common picking conveyor;

(f) presenting the source and destination loading aids next to one another in the conveying direction as a picking group to the order picker on the one common picking conveyor.

2. The method according to claim 1, wherein the source loading aids and the destination loading aids are separated again in an outfeed section downstream of the picking station and conveyed on the second conveyor system.

3. The method according to claim 1, wherein the source loading aids and/or the destination loading aids are provided on a transport conveying device, which is connected to the one common picking conveyor upstream of the order-picking station, and inducted and/or transferred onto the one common picking conveyor in an amount which corresponds to the picking order.

4. The method according to claim 1, wherein before the destination loading aids are transferred onto the one common picking conveyor in an infeed section, the destination loading aids each are moved past a detection device and each are identified by the control device based on a data carrier disposed on the destination loading aid.

5. The method according to claim 1, wherein at least one destination loading aid in the working area for the order picker is discharged from the one common picking conveyor onto a laterally disposed parking station, which is connected to the one common picking conveyor in the working area, into at least one buffer position on a storage space and is once again transferred onto the one common picking conveyor from the buffer position after at least one picking operation.

6. The method according to claim 1, wherein the source loading aids and the destination loading aids are merged onto the one common picking conveyor in an infeed section upstream of the picking station according to the picking order.

7. The method according to claim 6, wherein the source loading aids and/or the destination loading aids are provided upstream of the infeed section on a transport conveying device in a sequence sorted according to picking orders.

8. The method according to claim 1, wherein before the destination loading aids are transferred onto the one common picking conveyor, the source loading aids each are moved past a detection device and each are identified by the control device based on a data carrier disposed on the source loading aid.

9. The method according to claim 8, wherein the method further comprises:
(a) recording picking orders via the control device,
(b) providing source loading aids based on the picking orders,
(c) once a source loading aid of the source loading aids has been identified, the control device determines based on a picking order of the picking orders a number of destination loading aids required for the picking order and
(d) a corresponding number of destination loading aids is transferred onto the one common picking conveyor and conveyed on the one common picking conveyor together with the source loading aids, wherein the source loading aid so identified and the number of destination loading aids form the picking group.

10. The method according to claim 8, wherein the method further comprises:
(a) recording picking orders via the control device, a picking order of the picking orders including different articles,
(b) providing source loading aids based on the picking orders,
(c) once a first source loading aid of the source loading aids has been identified, the control device determines based on the picking order at least a second source loading aid as well as a number of destination loading aids, and
(d) the first source loading aid, the second source loading aid and the number of destination loading aids are conveyed on the one common picking conveyor together, wherein the source loading aids and the number of destination loading aids form the picking group.

11. The method according to claim 8, wherein the method further comprises:
(a) recording picking orders via the control device, said picking orders having a first picking order and a second picking order both including the same article,
(b) providing at least one article in said source loading aid,
(c) once a source loading aid of the source loading aids has been identified, the control device determines based on the first picking picking order a number of first destination loading aids required for the first picking order,
(d) once said source loading aid for the first picking order has been identified, the control device additionally evaluates other entered picking orders which require an article from said source loading aid,
(e) the second picking order of the other entered picking order is processed by transferring a determined number of second destination loading aids onto the one common picking conveyor in the infeed section and
(f) the source loading aid, the number of first destination loading aids and the number of second destination loading aids are conveyed on the one common picking conveyor together, wherein the source loading aid and the destination loading aids of the first and second picking orders form the picking group.

12. Order-picking station for picking articles from source loading aids into destination loading aids by an order picker, which order-picking station comprises
a first conveyor system comprising a first transport conveying device for transporting source loading aids to the order-picking station and a second transport conveying device for transporting destination loading aids to the order-picking station and
a second conveyor system for transporting source loading aids and destination loading aids away from the order-picking station as well as
a control device for coordinating the conveying movements of the loading aids, wherein
the second transport conveying device for transporting destination loading aids to the order-picking station adjoins the first conveyor system in a feeding section and a storage return conveyor system and a delivery conveying system for automated transporting the source loading aids and destination loading aids away from the order-picking station adjoin in a discharge section, and the first conveyor system exclusively comprises one single picking conveyor passing through the working area for the order picker for transporting source loading aids and destination loading aids as well as an infeed diverter device for conveying and inducting source loading aids and destination loading aids from the transport conveying devices onto the picking conveyor, and wherein a detection device for reading a data carrier arranged on the respective source loading aids is disposed along the transport conveying device upstream with respect to the feeding section, wherein the detection device is connected with the control device, which identifies the source loading aids and determines the number of certain source loading aids and destination loading aids required for a picking order, and wherein the infeed diverter device can be controlled by the control device in such a way that according to a picking order prior to a picking operation, at least one destination loading aid can be transferred onto the picking conveyor, so that the source and destination loading aids can be presented to the order picker arranged next to one another as a picking group on the picking conveyor.

13. Order-picking station according to claim 12, wherein a parking station is provided which is connected to the picking conveyor in the working area and forms a parking plane extending in the conveying plane, onto which parking station a destination loading aid transported on the picking conveyor can be discharged and after at least one picking operation once again transferred from the parking station onto the picking conveyor.

14. Order-picking station according to claim 12, wherein above the picking conveyor and in its longitudinal orientation covers are displaceably mounted to a frame of the order-picking station, which covers delimit a working area for the order picker.

15. Storage system with an article warehouse for source loading aids, a distribution system for source loading aids which is connected to the article warehouse and at least one order-picking station according to claim 12 which is connected to the distribution system.

* * * * *